US007081746B2

(12) United States Patent
Aoki et al.

(10) Patent No.: US 7,081,746 B2
(45) Date of Patent: Jul. 25, 2006

(54) INDUCTIVE DISPLACEMENT DETECTOR AND MICROMETER

(75) Inventors: Toshihiko Aoki, Kawasaki (JP); Shozaburo Tsuji, Kawasaki (JP); Kenichi Nakayama, Miyazaki (JP)

(73) Assignee: Mitutoyo Corporation, Kawasaki (JP)

( * ) Notice: Subject to any disclaimer, the term of this patent is extended or adjusted under 35 U.S.C. 154(b) by 129 days.

(21) Appl. No.: 10/972,347

(22) Filed: Oct. 26, 2004

(65) Prior Publication Data

US 2005/0122197 A1 Jun. 9, 2005

(30) Foreign Application Priority Data

Oct. 30, 2003 (JP) ............................. 2003-370895

(51) Int. Cl.
*G01B 7/30* (2006.01)

(52) U.S. Cl. ........................... 324/207.25; 324/207.15; 324/207.24

(58) Field of Classification Search ........... 324/207.24, 324/207.25, 207.15
See application file for complete search history.

(56) References Cited

U.S. PATENT DOCUMENTS 5,841,274 A 11/1998 Masreliez et al.

FOREIGN PATENT DOCUMENTS

JP A 8-313295 11/1996
JP A 10-318781 12/1998

*Primary Examiner*—Bot LeDynh
(74) *Attorney, Agent, or Firm*—Oliff & Berridge, PLC

(57) ABSTRACT

An inductive displacement detector of a rotary type is disclosed, which includes a first flux coupling winding and a second flux coupling winding alternately arranged on a rotor. The first flux coupling winding has a line conductor crossed. The second flux coupling winding has a line conductor not crossed. In the first and second flux coupling windings the transmission conductors thereof share a side.

19 Claims, 12 Drawing Sheets

INDUCTIVE DISPLACEMENT DETECTOR AND MICROMETER

CROSS-REFERENCE TO RELATED APPLICATION

This application is based upon and claims the benefit of priority from the prior Japanese Patent Application No. 2003-370895, filed on Oct. 30, 2003; the entire contents of which are incorporated herein by reference.

BACKGROUND OF THE INVENTION

1. Field of the Invention

The present invention relates to an inductive displacement detector operative to detect a displacement using magnetic coupling (flux coupling) for use in applications to small measuring tools typically including a caliper and a micrometer, rotary encoders, linear encoders, and sensor instruments.

2. Description of the Related Art

Inductive displacement detectors have been employed to accurately measure a linear displacement or an angular displacement in the art. The detectors are classified into a linear type and a rotary type. The Inductive displacement detector of the linear type comprises a scale including flux coupling windings arranged at a certain pitch; and a sensor head arranged opposite to and movable relative to the scale. The sensor head includes a transmission winding and a receiver winding arranged for flux coupling to the flux coupling windings. This configuration is disclosed in FIG. 1 of JP-A 10/318781, for example. In the inductive displacement detector of the rotary type on the other hand, the transmission winding and the receiver winding are arranged on a stator, and a conductive plate similarly serving as the flux coupling windings is arranged on a rotor. This is disclosed in FIG. 16 of JP-A 8/313295, for example.

SUMMARY OF THE INVENTION

The inductive displacement detector can be utilized for accurate measurements though its displacement detection accuracy may be lowered if the strength of a signal received at the receiver winding is low or if flux coupling occurs at an undesired location (crosstalk).

The present invention has an object to provide an inductive displacement detector capable of enhancing the strength of a signal received at a receiver winding and easily correcting crosstalk.

In an example, an inductive displacement detector according to the present invention comprises a pair of winding holders arranged opposite, one to the other; a transmission winding arranged on the one winding holder and configured to extend from one end to a folded portion and fold back therefrom to the other end; a receiver winding including a plurality of reception loops arranged along the transmission winding on the one winding holder; and a plurality of flux coupling windings capable of movement in a direction relative to the transmission winding and the receiver winding, each flux coupling winding including a closed line conductor, crossed or not crossed, having a receiver conductor capable of flux coupling to the transmission winding and a transmission conductor capable of flux coupling to the receiver winding. The flux coupling winding with the line conductor crossed and the flux coupling winding with the line conductor not crossed are alternately arranged on the other winding holder. Adjacent transmission conductors share a side extending in a direction crossing the direction of relative movement.

In the example of the inductive displacement detector according to the present invention, adjacent transmission conductors share a side extending in a direction crossing the direction of relative movement to prevent formation of any space between the adjacent transmission conductors. Therefore, (i) the area of the transmission conductor can be extended to enhance the reception strength at the receiver winding. In addition, (ii) crosstalk can be easily corrected because the crosstalk derived from the folded portion and the terminal of the transmission winding can be always received.

In the example of the inductive displacement detector according to the present invention, the flux coupling winding with the line conductor crossed may locate the receiver conductor and the transmission conductor entirely in the same plane, with a three-dimensional intersection of the line conductor formed at a connection portion between the receiver conductor and the transmission conductor.

In this configuration, the receiver conductor (transmission conductor) is entirely located in the same plane to bring the receiver conductor (transmission conductor) into balance and accordingly improve the measurement accuracy.

In the example of the inductive displacement detector according to the present invention, the one winding holder may comprise a stator, and the other winding holder may comprise a rotor. The transmission winding may be configured to extend from the one end to the folded portion describing a ring and fold back therefrom and extend to the other end describing another ring. The flux coupling windings may be alternately arranged in a ring in one aspect. This is an application of the present invention to the rotary type such as a micrometer. In this aspect, (a) the two rings of the transmission winding may be both located more inwardly than the receiver winding. In addition, (b) the receiver winding may have an almost sin curve shape, (c) the receiver winding may have a circular arc shape, and (d) the receiver winding may have a circumferential shape.

In the example of the inductive displacement detector according to the present invention, the one winding holder may comprise a sensor head, and the other winding holder may comprise a scale capable of movement in a linear direction relative to the sensor head. The transmission winding may be configured to extend from the one end linearly to the folded portion and fold back therefrom and extend again linearly to the other end. The flux coupling windings may be alternately arranged linearly. This is an application of the present invention to the linear type.

In another example, an inductive displacement detector according to the present invention comprises a stator and a rotor arranged opposite to each other; a transmission winding arranged on the stator and configured to extend from one end to the other end describing a ring; a receiver winding including a plurality of reception loops arranged along the transmission winding on the stator; and a plurality of flux coupling windings, each including a closed line conductor, crossed or not crossed, having a receiver conductor capable of flux coupling to the transmission winding and a transmission conductor capable of flux coupling to the receiver winding. The flux coupling winding with the line conductor crossed and the flux coupling winding with the line conductor not crossed are alternately arranged in a ring on the rotor. Adjacent transmission conductors share a side extending along a radius of the rotor.

In the other example of the present invention, for the same reason as that given to the above example, it is possible to enhance the reception strength at the receiver winding and easily correct crosstalk. In this case, however, the crosstalk is caused not from the folded portion but from both ends of the transmission winding (transmission line).

The other example of the present invention may have, like the above example, the following aspects. (a)The flux coupling winding with the line conductor crossed may locate the receiver conductor and the transmission conductor entirely in the same planes with a three-dimensional intersection of the line conductor formed at a connection portion between the receiver conductor and the transmission conductor. (b) The two rings of the transmission winding may be both located more inwardly than the receiver winding. (c) The receiver winding may have an almost sin curve shape. (d) The receiver winding may have a circular arc shape. (e) The receiver winding may have a circumferential shape. (f) A micrometer, comprising the other example of the inductive displacement detector according to the present invention mounted thereon.

In yet another example, an inductive displacement detector according to the present invention comprises a sensor head; a scale arranged opposite to the sensor head and capable of movement in a linear direction relative to the sensor head; a transmission line arranged on the sensor head and configured to extend from one end to the other end in a straight line; a receiver winding including a plurality of reception loops arranged along the transmission line on the sensor head; and a plurality of flux coupling windings, each including a closed line conductor, crossed or not crossed, having a receiver conductor capable of flux coupling to the transmission line and a transmission conductor capable of flux coupling to the receiver winding. The flux coupling winding with the line conductor crossed and the flux coupling winding with the line conductor not crossed are alternately arranged linearly on the scale. Adjacent transmission conductors share a side extending in a direction crossing the direction of relative movement.

In the yet another example of the present invention, for the same reason as that given to the above example, it is possible to enhance the reception strength at the receiver winding and easily correct crosstalk. In this case, however, the crosstalk is caused not from the folded portion but from both ends of the transmission winding (transmission line).

The yet another example of the present invention may have, like the above example, the following aspects. (a) The flux coupling winding with the line conductor crossed may locate the receiver conductor and the transmission conductor entirely in the same plane, with a three-dimensional intersection of the line conductor formed at a connection portion between the receiver conductor and the transmission conductor. (b) The receiver winding may have an almost sin curve shape.

DETAILED DESCRIPTION OF THE INVENTION

The embodiments of the present invention will now be described with reference to the drawings.

First Embodiment

The inductive displacement detector according to the first embodiment is a rotary encoder. Of transmission conductors contained in flux coupling windings that are arranged on a rotor of this encoder, adjacent ones share a side as a primary characteristic of the first embodiment. The first embodiment is described in detail below.

Figure 1:
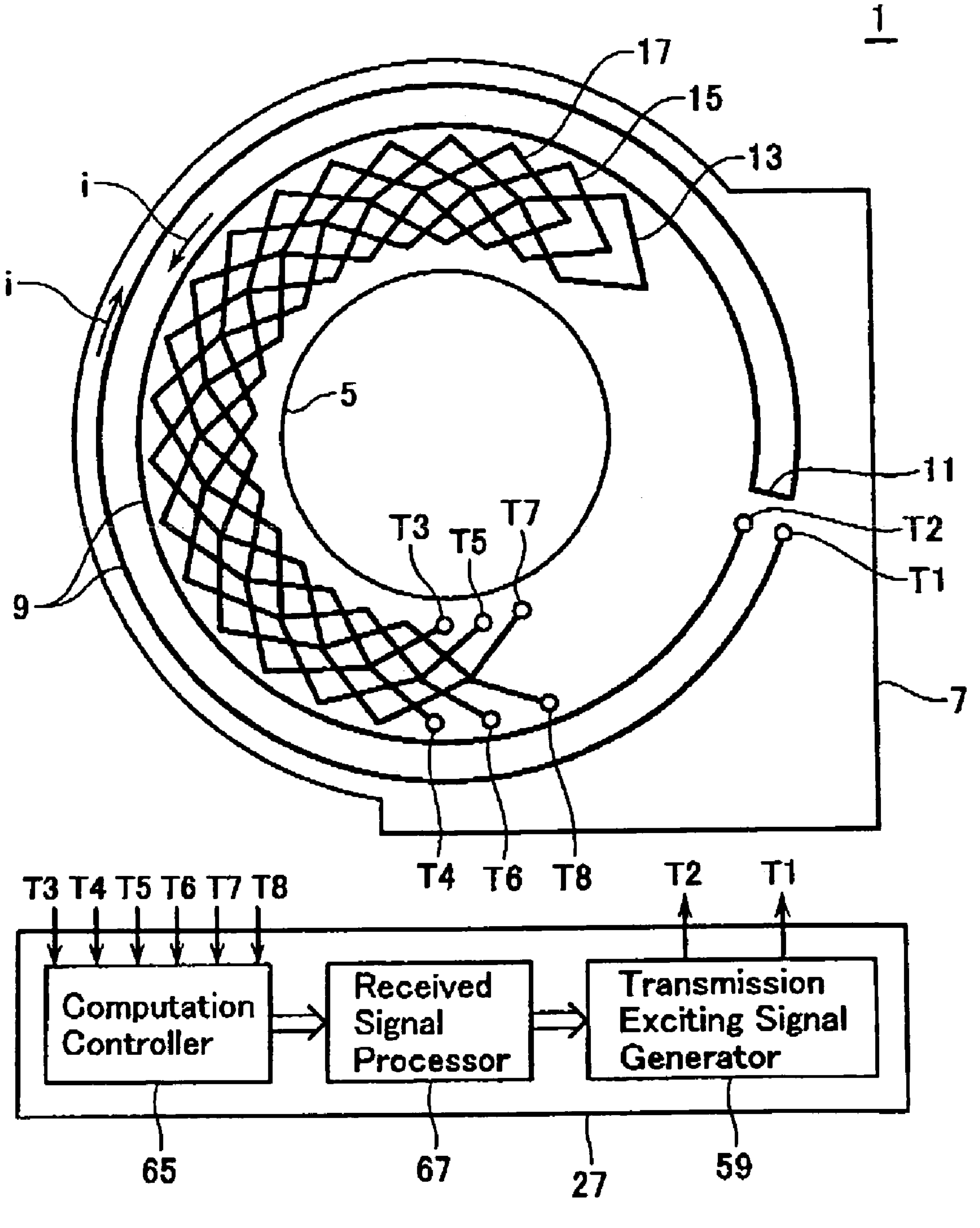
FIG. 1 is a plan view of a stator of an inductive displacement detector according to a first embodiment.
Figure 2:
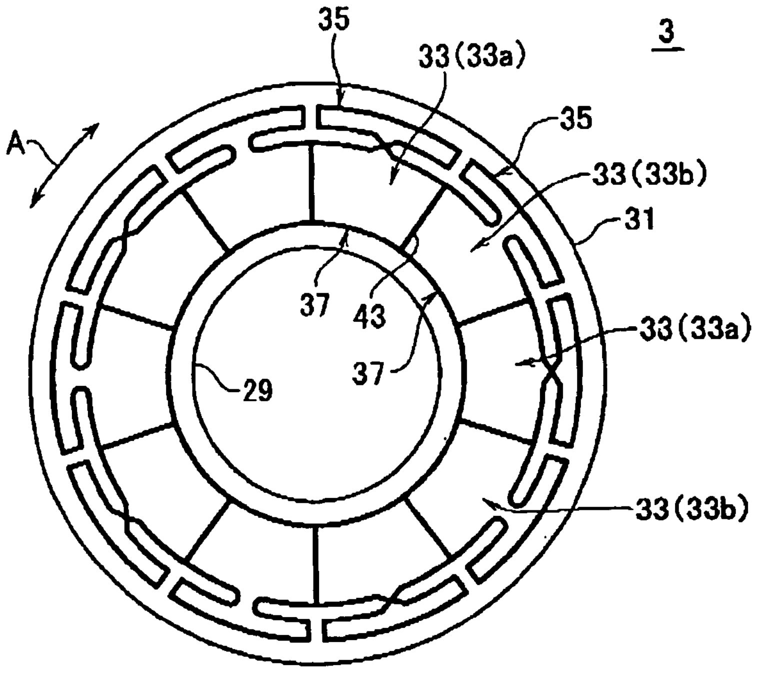
FIG. 2 is a plan view of a rotor of the inductive displacement detector according to the first embodiment.

FIG. 1 is a plan view of a stator 1 that is a component of the inductive displacement detector according to the first embodiment. FIG. 2 is a plan view of a rotor 3 similarly. The stator 1 (an example of one of winding holders) and the rotor 3 (an example of the other of winding holders) are arranged opposite to each other. The rotor 3 is supported rotatably in the circumferential direction A. The stator 1 and the rotor 3 may be formed on respective printed circuit boards.

The stator 1 in FIG. 1 is described first. The stator 1 comprises an insulation substrate 7 composed of a resin, for example, with a hole 5 formed through the center. A transmission winding 9 is arranged on the insulation substrate 7 surrounding the hole 5. In more detail, the transmission winding 9 is configured to extend from one end or a terminal T1 to a folded portion 11 describing a ring (circle) and fold back therefrom and extend to the other end or a terminal T2 describing another ring (circle).

Figure 3:
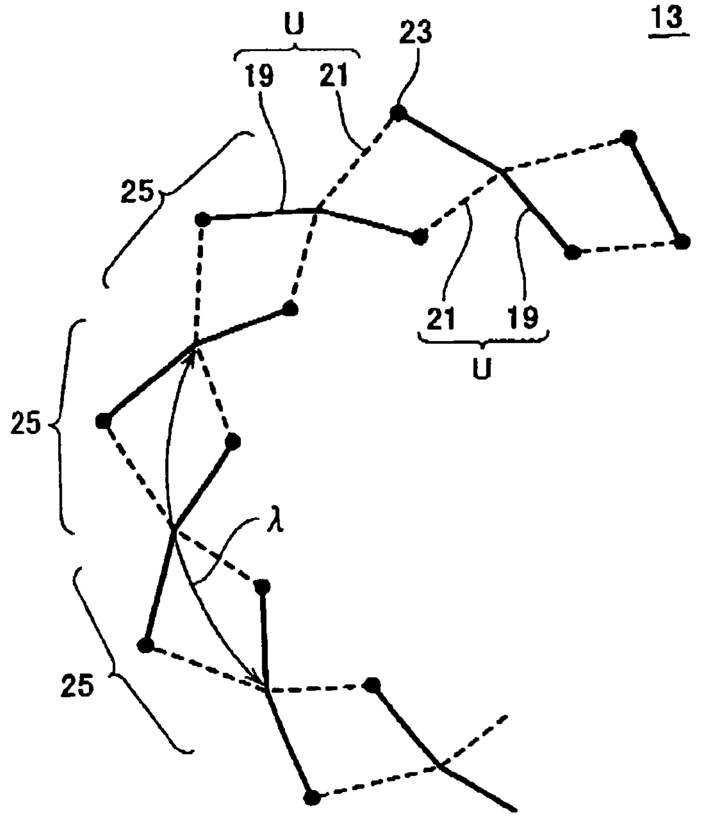
FIG. 3 is a plan view of a receiver winding arranged on the stator of FIG. 1.
Figure 4:
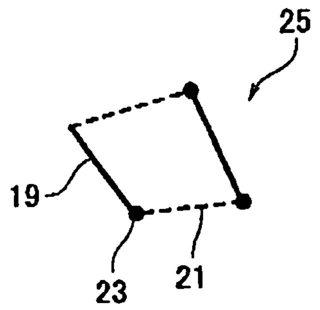
FIG. 4 is a plan view of a reception loop contained in the receiver winding.

On the insulation substrate 7 between the transmission winding 9 and the hole 5, three circular arc receiver windings 13, 15 and 17 are arranged along the inner circumference of the transmission winding 9. These receiver windings 13, 15 and 17 Comprise a plurality of reception loops, which are arranged with spatial phase shifts. Three receiver windings 13, 15 and 17 have the same structure. The structure of a receiver winding is described taking the winding 13 as an example FIG. 3 is a plan view of the receiver winding 13. The receiver winding 13 includes a plurality of sets U each having an upper layer wire 19 and a lower layer wire 21 with a three-dimensional intersection formed therebetween. These sets U are arranged in a circular arc. An insulation layer, not shown, is disposed between the upper layer wire 19 and the lower layer wire 21. An end of the upper layer wire 19 is connected with an end of the lower layer wire 21 through a via-hole 23 formed through the insulation layer. Accordingly, the receiver winding 13 includes a plurality of almost diamond reception loops 25 arranged along the transmission winding 9 (FIG. 1). FIG. 4 is a plan view of one reception loop 25.

In the example described above, the upper layer wire 19 and the lower layer wire 21 are formed on the one surface of the insulation layer 7 (FIG. 1). Alternatively, the upper layer wire 19 may be arranged on the one surface of the insulation layer 7 and the lower layer wire 21 on the other surface. In this configuration, an end of the upper layer wire 19 is connected to an end of the lower layer wire 21 via a through-hole provided through the insulation layer 7.

Returning to the description given to FIG. 1, the receiver windings 13, 15 and 17 are arranged with a phase shift of λ/6 each. As shown in FIG. 3. λ is equal to a dimension of two reception loops 25 along the circumferential direction A (FIG. 2).

The receiver windings 13, 15 and 17 are located at a certain distance (for example, about one and a half reception loops 25) from the folded portion 11 of the transmission winding 9. This reason is given below. The transmission winding 9 is shaped in a ring except the location of the folded portion 11. The folded portion 11 is shaped in a straight line extending along a radius of the ring. In this way, the transmission winding 9 has an irregular shape that sharply changes the direction of extension at the location of the folded portion 11. Accordingly, a magnetic field generated by the transmission winding 9 varies its distribution and strength to cause a distortion near the folded portion 11 and the terminals T1, T2. Therefore, when the receiver windings 13, 15 and 17 make flux coupling (crosstalk) with the folded portion 11, the receiver windings 13, 15 and 17 suffer the distorted magnetic field and lower the displacement detection accuracy accordingly. For this reason, the receiver windings 13, 15 and 17 are located at a certain distance from the folded portion 11.

Terminals T3, T4 of the receiver winding 13, terminals T5, T6 of the receiver winding 15, terminals T7, T8 of the receiver winding 17, and the terminals T1, T2 of the transmission winding 9 are connected via wires, not shown, to an IC circuit 27. It is operative to execute computation and control for displacement measurement, for example. The IC circuit 27 may be arranged on the stator 1 or may be attached to a different member.

The first embodiment exemplifies three receiver windings 13, 15 and 17 arranged with different phases, or three-phase receiver windings. The present invention may be applicable to a single receiver winding (one-phase receiver winding), two receiver windings arranged with different phases (two-phase receiver windings), and four or more receiver windings arranged with different phases (four or more-phase receiver windings) as well.

The configuration of the rotor 3 is described next with reference to FIG. 2. The rotor 3 includes a disc-like insulation substrate 31 composed of a resin, for example, with a hole 29 formed through the center. Plural flux coupling windings 33 are arranged in a ring on the insulation substrate 31 surrounding the hole 29. A rotary shaft, not shown, is inserted through the hole 5 of the stator 1 in FIG. 1. This rotary shaft is fixed in the hole 29 of the rotor 3 to support the rotor 3 rotatably in the circumferential direction A. In this state, the flux coupling windings 33 oppose the transmission winding 9 and the receiver windings 13, 15, 17 in FIG. 1.

The windings 33 include flux coupling windings 33*a* with a line conductor crossed and flux coupling windings 33*b* with a line conductor not crossed. The flux coupling winding 33*a* and the flux coupling winding 33*b* are arranged alternately. As the rotor 3 is rotatable along the circumferential direction A, the flux coupling windings 33 are movable relative to the transmission winding 9 and the receiver windings 13, 15, 17.

Figure 5:
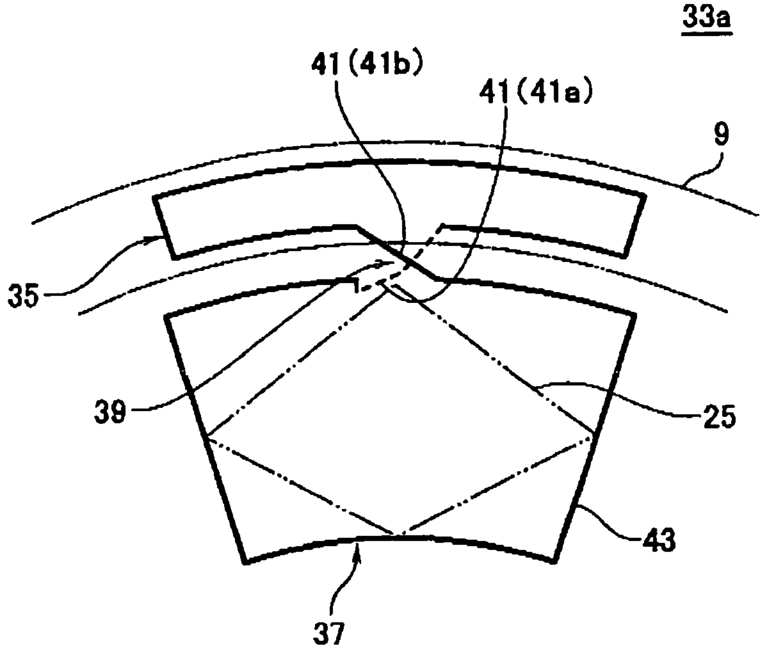
FIG. 5 is a plan view of a flux coupling winding arranged on the rotor of FIG. 2 with a line conductor crossed.
Figure 6:
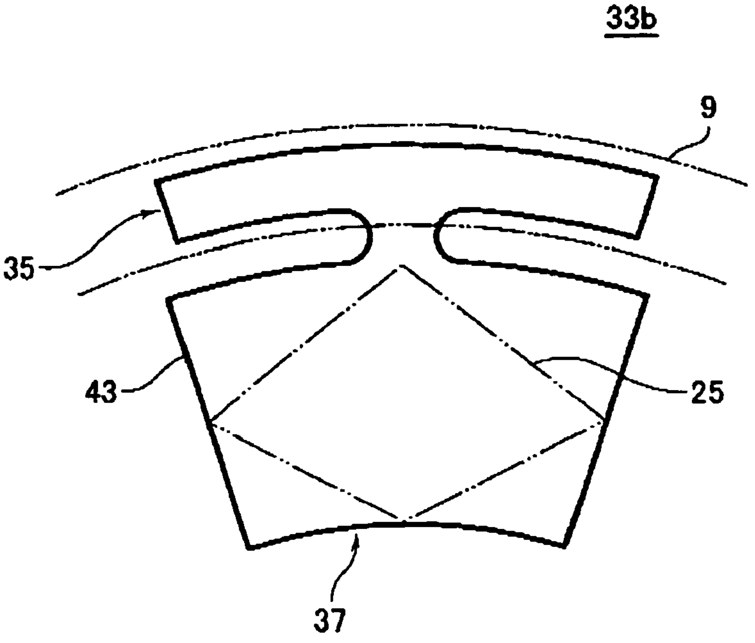
FIG. 6 is a plan view of a flux coupling winding arranged on the rotor of FIG. 2 with a line conductor not crossed.

FIG. 5 is a plan view of the flux coupling winding 33*a*, and FIG. 6 is a plan view of the flux coupling winding 33*b*. A flux coupling winding 33 includes a closed line conductor having a receiver conductor 35 capable of flux coupling to the transmission winding 9 and a transmission conductor 37 capable of flux coupling to the reception loop 25 (that is, the receiver winding 13, 15, 17). The flux coupling winding 33*a* is configured with the line conductor crossed. Specifically, it can be described that the flux coupling winding 33*a* forms a three-dimensional intersection of line conductors 41 at a connection portion 39 between the receiver conductor 35 and the transmission conductor 37.

The structure of the three-dimensional intersection can be achieved as follows. A lower layer line conductor 41*a* is formed on the insulation substrate 31 (FIG. 2). An insulation layer is formed to cover the line conductor 41*a*. Via-holes are formed through the insulation layer to expose both ends of the line conductor 41*a*. An upper layer line conductor 41*b* is formed on the insulation layer. The line conductor 41*a* is connected to the line conductor 41*b* through the via-holes. The upper layer line conductor 41*b* forms the receiver conductor 35 and the transmission conductor 37. Alternatively, the line conductor 41*b* may be arranged on one of surfaces of the insulation substrate 31, and the line conductor 41*a* on the other. In this case, the line conductor 41*b* is connected with the line conductor 41*a* via lugs buried in through-holes provided through the insulation substrate 31.

As obvious from the foregoing, the flux coupling winding 33*a* shown in FIG. 5 locates the receiver conductor 35 and the transmission conductor 37 entirely in the same plane. In this case, the line conductors 41 form a three-dimensional intersection at a connection portion between the receiver conductor 35 and the transmission conductor 37. The three-dimensional Intersection may be structured to arrange the right half of the receiver conductor 35 and the left half of the transmission conductor 37 in the lower layer, and the left half of the receiver conductor 35 and the right half of the transmission conductor 37 in the upper layer. Rather than this configuration, however, the configuration shown in FIG.

5 is effective to improve the measurement accuracy because the receiver conductor 35 (transmission conductor 37) is entirely located in the same plane to bring the receiver conductor 35 (transmission conductor 37) into balance.

Figure 7:
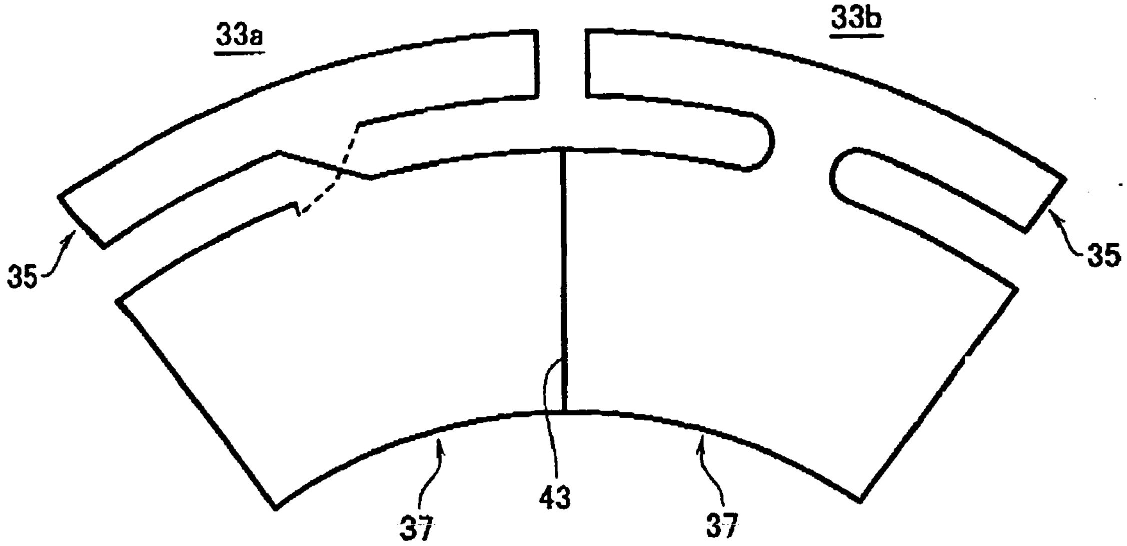
FIG. 7 is a plan view of adjacent flux coupling windings.

FIG. 7 is a plan view of adjacent flux coupling windings 33*a* and 33*b*. The transmission conductor 37 of the winding 33*a* and the transmission conductor 37 of the winding 33*b* share a side 43 that extends along a radius of the rotor 3 (FIG. 2). In a word, the adjacent transmission conductors 37 share the side 43 that extends in a direction crossing the circumferential direction A (an example of the direction of relative movement). The flux coupling windings 33, the transmission winding 9, and the receiver windings 13, 15, 17 may be composed of a low-resistance material such as aluminum, copper and gold.

Figure 8:
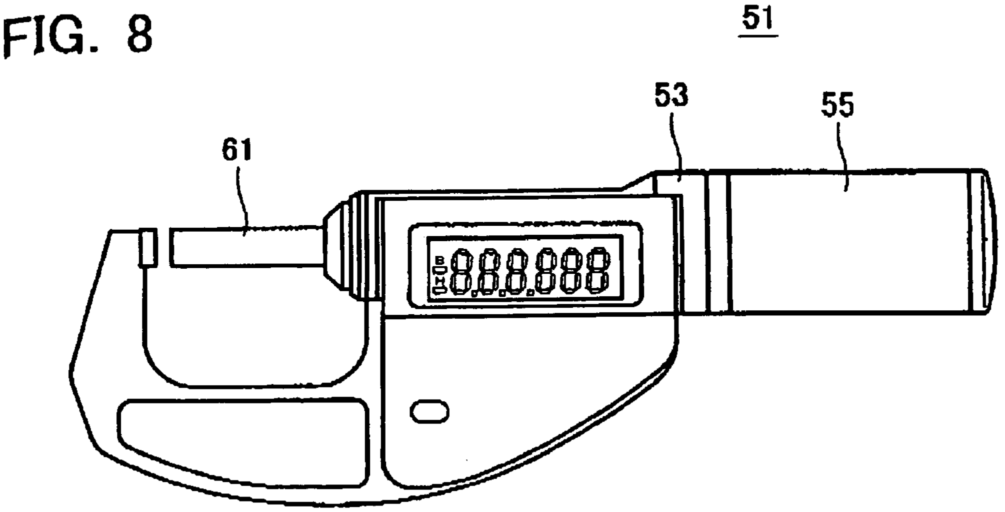
FIG. 8 is a front view of a micrometer equipped with the inductive displacement detector according to the first embodiment.

FIG. 8 is a front view of a micrometer 51 equipped with the inductive displacement detector according to the first embodiment. The stator 1 is fixed on a frame 53 and the rotor 3 on a thimble 55.

During the use in a site of production, a coolant or oil from a machine tool may penetrate into the inside of the micrometer via the periphery of a spindle 61. In such the case, a digital micrometer using a conventional capacitive coupling rotary encoder may cause an erroneous operation. To the contrary, a digital micrometer using the inductive displacement detector according to the present invention can detect a displacement without causing an erroneous operation because of its detection principle of electromagnetic induction. Therefore, it is possible to provide a digital micrometer excellent in resistance to the environment more than the prior art.

Figure 9:
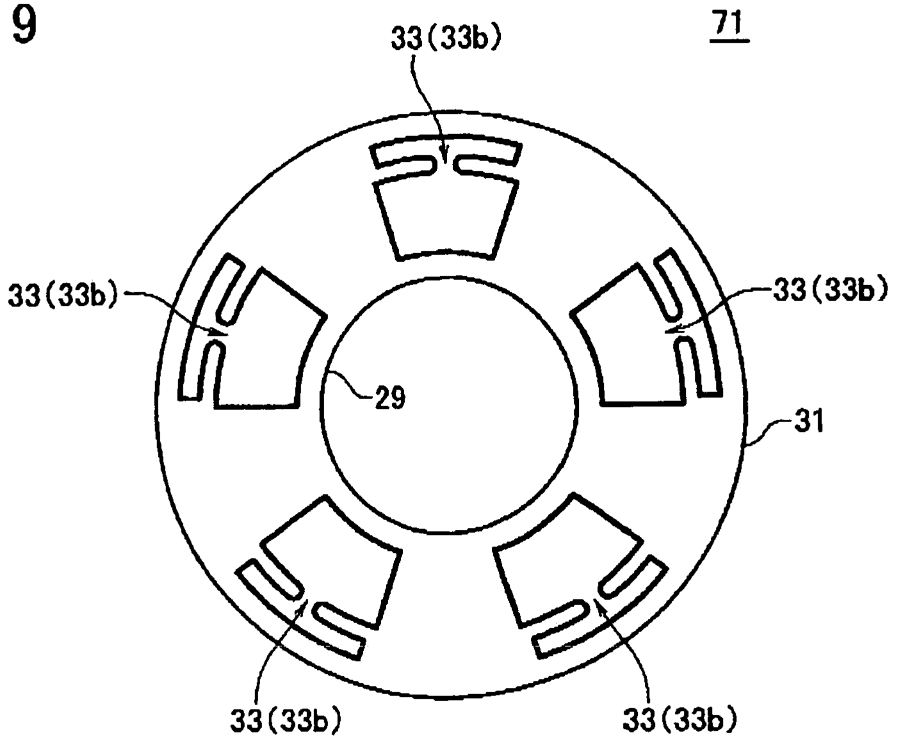
FIG. 9 is a plan view of a rotor according to a comparative example.

The first embodiment has the following two main effects. The first effect is described first in comparison with a comparative example. FIG. 9 is a plan view of a rotor 71 according to the comparative example. It differs from the rotor 3 according to the first embodiment shown in FIG. 2 in that the flux coupling windings 33 include no flux coupling winding 33*a* with a line conductor crossed. This configuration provides a space of one flux coupling winding 33 (also referred to as a space of one reception loop 25) between the flux coupling windings 33*b*. The reason for the space provided is described with reference to FIG. 10, which is a plan view of adjacent flux coupling windings 33*b* and reception loops 25 when the above space is not provided.

The direction of a current flowing in a transmission conductor 37 at a certain time is shown by the arrow i1. At this moment, the direction of a current flowing in a reception loop 25-1 flux-coupled to a transmission conductor 37-1 and a reception loop 25-2 flux-coupled to a transmission conductor 37-2 is shown by the arrow i2. Therefore, the current flowing in the reception loop 25-1 and the current flowing in the reception loop 25-2 cancel each other out and allows no received signal to flow in the receiver winding accordingly.

Figure 10:
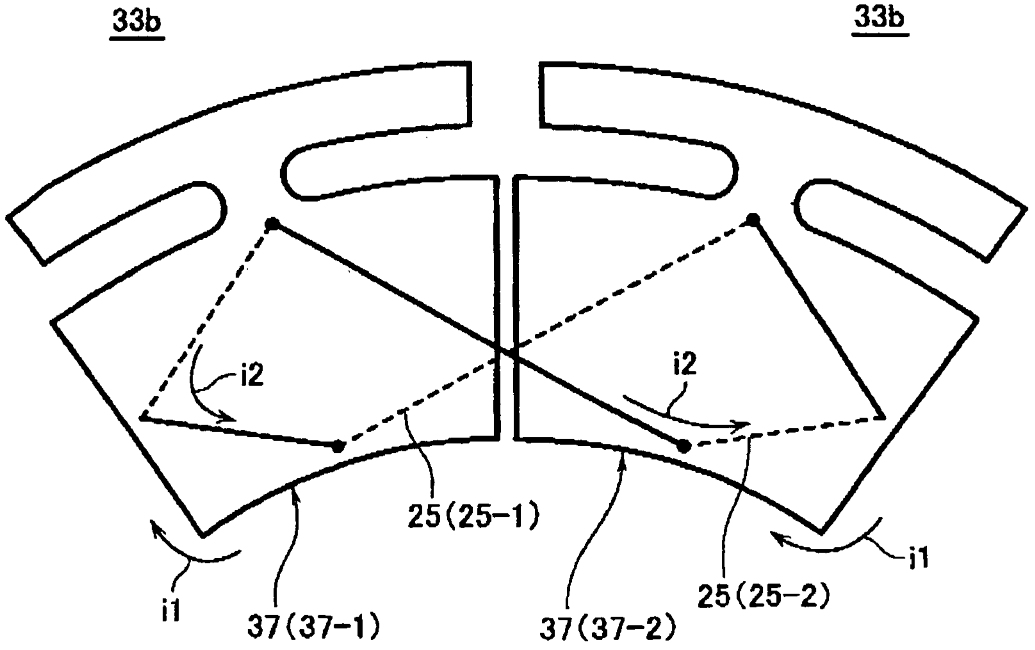
FIG. 10 is a plan view of adjacent flux coupling windings and a reception loops when a space of one reception loop is not provided.

Thus, in the comparative example, the above space is provided between adjacent flux coupling windings 33*b*. In a word, only one of adjacent flux coupling windings 33*b* in FIG. 10 is left so that only one of adjacent reception loops 25 is allowed to make flux coupling to the transmission conductor 37. In this case, the number of the flux coupling windings 33 that can be arranged on the insulation substrate 31 is reduced as shown in FIG. 9, and the strength of the signal received at the receiver winding can not be enhanced accordingly.

Figure 11:
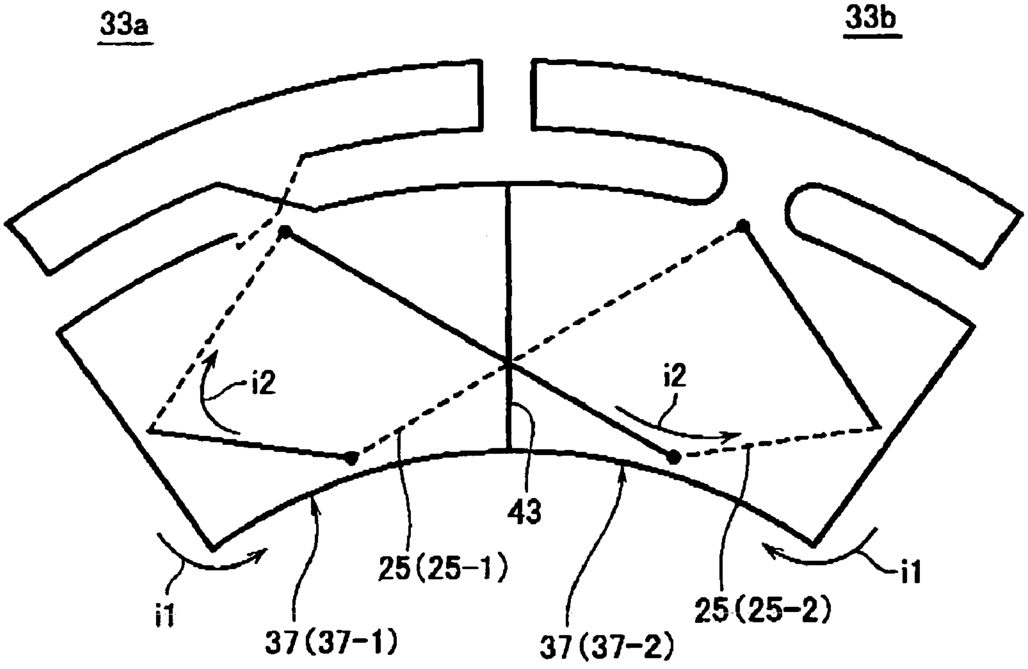
FIG. 11 is a plan view of adjacent flux coupling windings arranged on the rotor according to the first embodiment.

To the contrary, such the cancellation is not caused in the first embodiment even though the flux coupling windings 33 are arranged without any space as shown in FIG. 2. This reason is given with reference to FIG. 11, which is a plan view of adjacent flux coupling windings 33*a* and 33*b* on the rotor according to the first embodiment. The direction of a current flowing in the flux coupling winding 33*a*, 33*b* at a certain time is shown by tile arrow i1.

In the first embodiment, the flux coupling windings 33*a* with the line conductor crossed and the flux coupling windings 33*b* with the line conductor not crossed are arranged alternately. Accordingly, the currents flowing in adjacent transmission conductors 37-1 and 37-2 are opposite in direction, therefore, the current flowing in the reception loop 25-1 and the current flowing in the reception loop 25-2 are not allowed to cancel each other out. (In a word, the line conductor is crossed in one of adjacent flux coupling windings to invert the current flowing in the transmission conductor of the one flux coupling winding.

In the first embodiment, adjacent transmission conductors 37 share a side 43 to prevent formation of any space between the adjacent transmission conductors 37. In other words, adjacent transmission conductors 37 share a portion of the line conductor to prevent formation of any space between the adjacent transmission conductors 37. This is effective to widen the area of the transmission conductor 43 and accordingly enhance the strength of the signal received at the receiver windings 13, 15, 17. A test result provided by the inventor demonstrates that the rotor 3 in the first embodiment shown in FIG. 2 enhances the strength of the received signal about 2.5 times higher than the rotor 71 in the comparative example shown in FIG. 9.

Figure 12:
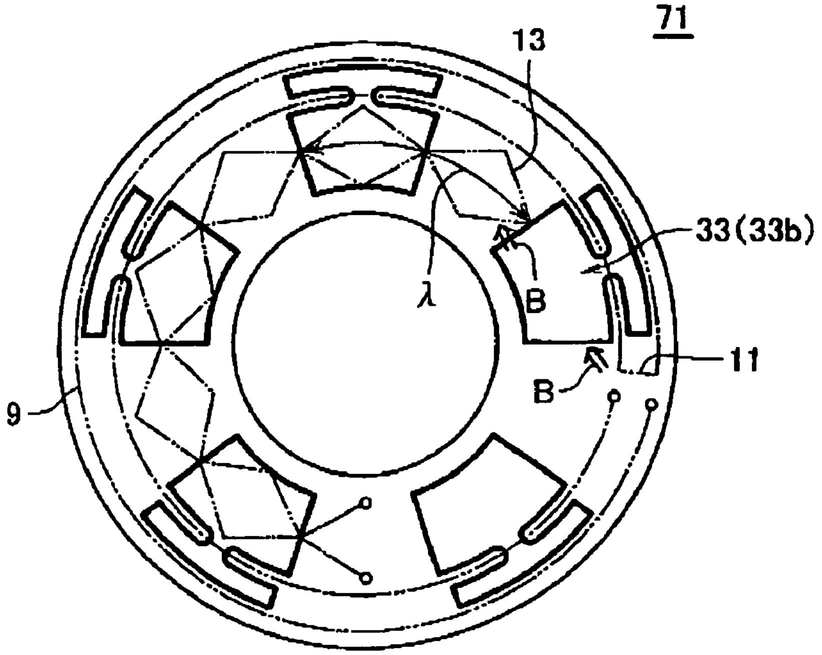
FIG. 12 is a plan view of a positional relation between the rotor according to the comparative example shown in FIG. 9 and transmission and receiver windings.

The second effect of the first embodiment is described. FIG. 12 is a plan view of a positional relation between the rotor 71 according to the comparative example shown in FIG. 9 and the transmission 9 and reception 13 windings. A magnetic field distortedly generated near the folded portion 11 and the terminals T1, T2 of the transmission winding 9 influences to cause crosstalk, which Is transmitted to the receiver winding 13 via the flux coupling winding 33 as shown by the arrow B. The positional relation of the flux coupling winding 33 located between the receiver winding 13 and the folded portion 11 as shown in FIG. 12 arises every time the flux coupling winding 33 moves by λ. If the time required for this movement equals a period of one signal, crosstalk appears at the period of one signal.

Figure 13:
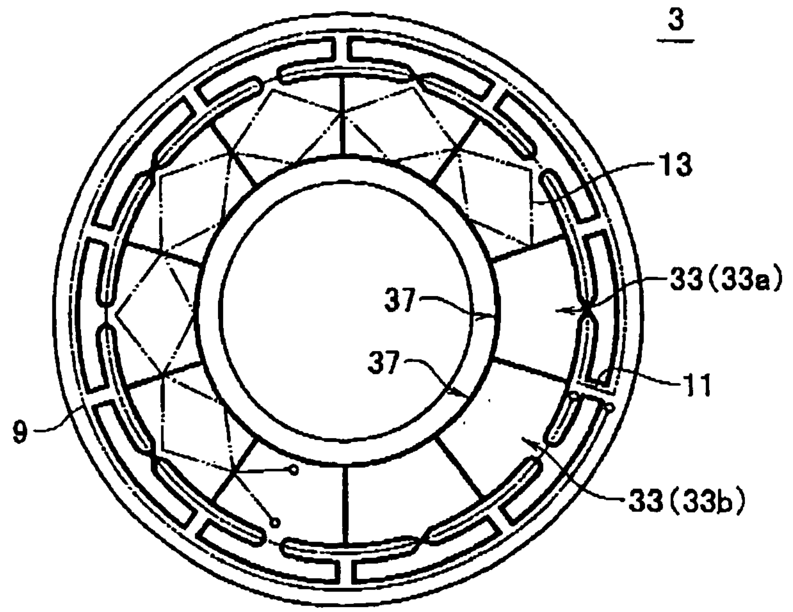
FIG. 13 is a plan view of a positional relation between the rotor according to the first embodiment shown in FIG. 2 and transmission and receiver windings.

FIG. 13 shows the first embodiment corresponding to FIG. 12. FIG. 13 is a plan view of a positional relation between the rotor 3 according to the first embodiment shown in FIG. 2 and transmission 9 and reception 13 windings. In the first embodiment, as no space is provided between adjacent transmission windings 37, the above crosstalk occurs always. The correction of crosstalk is easier when the crosstalk occurs always than when it occurs periodically. Therefore, the first embodiment is easier to correct crosstalk.

The first embodiment has the following first through third alternatives. These alternatives are possible to enhance the received strength at the receiver windings 13, 15, 17 and easily correct crosstalk as well for the same reason as that given to the first embodiment.

Figure 14:
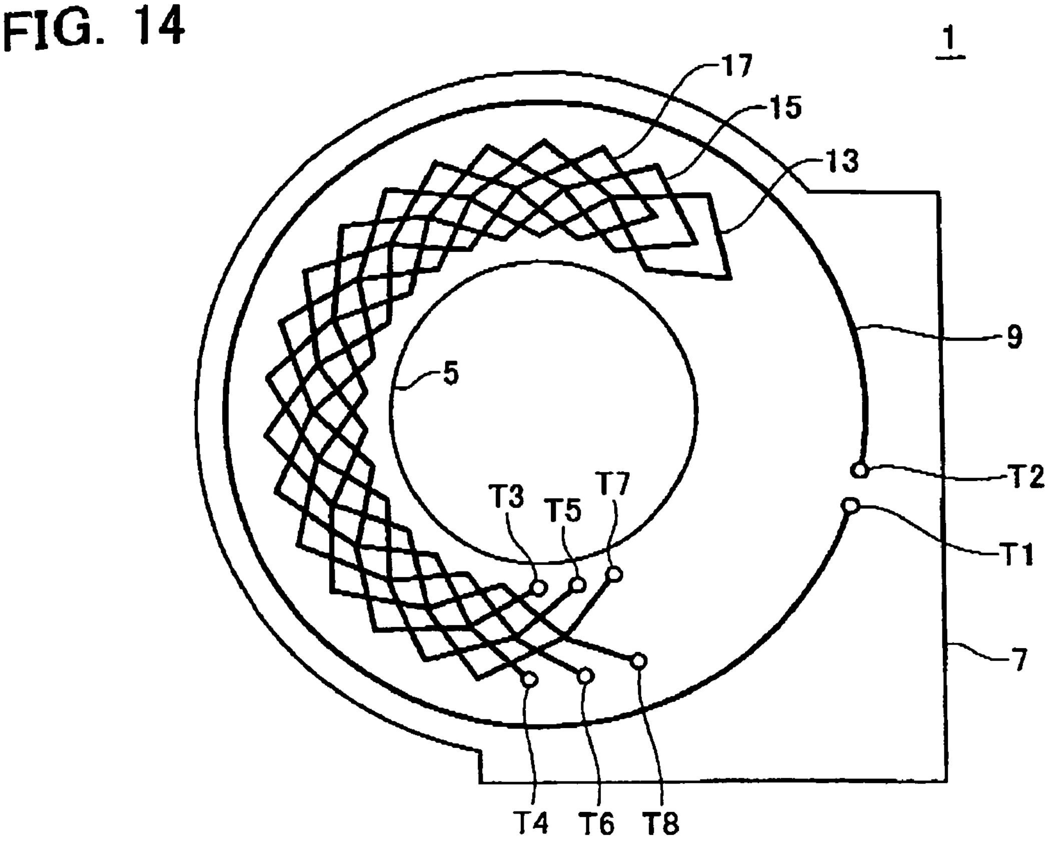
FIG. 14 is a plan view of a stator according to a first alternative of the first embodiment.

FIG. 14 is a plan view of the stator 1 in the first alternative. The first alternative differs from the stator 1 of FIG. 1 in that the transmission winding 9 includes a single ring. In a word, the transmission winding 9 is arranged on the stator 1 and configured to extend from a terminal T1 (one end) to a terminal T2 (the other end) describing a ring. The first alternative has sources of crosstalk at the terminals T1 and T2 (both ends).

Figure 15:
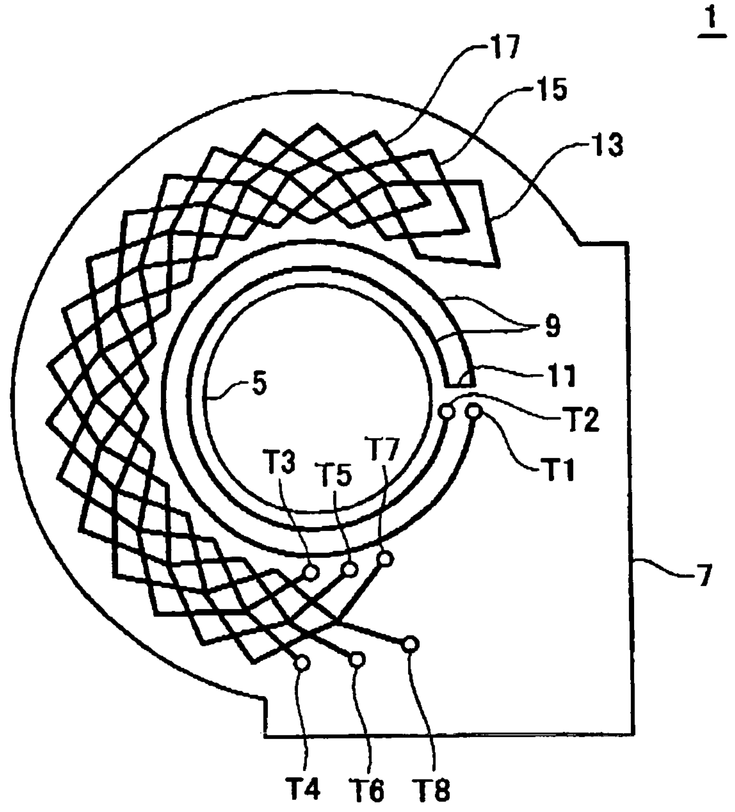
FIG. 15 is a plan view of a stator according to a second alternative of the first embodiment.

FIG. 15 is a plan view of the stator 1 according to the second alternative. This alternative differs from the stator 1 of FIG. 1 in that two rings of the transmission winding 9 are both located more inwardly than the receiver windings 13, 15, 17. The second alternative is possible to shorten the transmission winding 9 to lower the impedance of the transmission winding 9. As a result, a larger current can flow in the transmission winding 9 to increase the magnetic flux density in the transmission magnetic field and enhance the strength of the signal received at the receiver windings 13, 15, 17.

Figure 16:
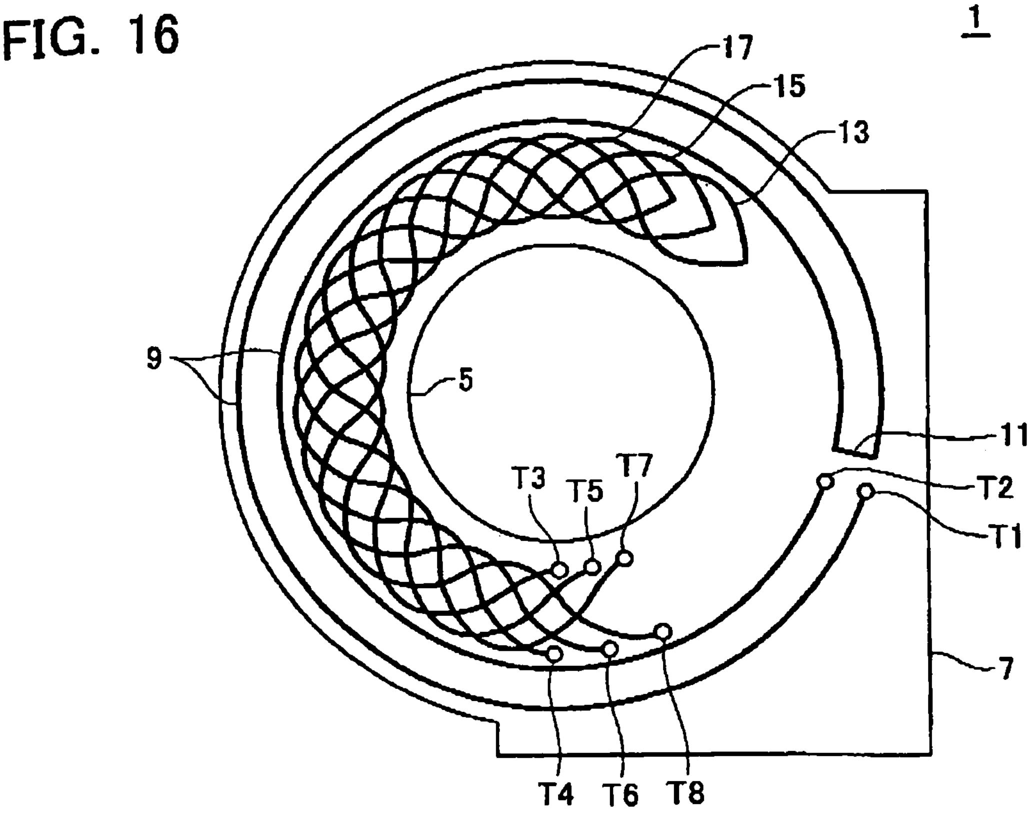
FIG. 16 is a plan view of a stator according to a third alternative of the first embodiment.

FIG. 16 is a plan view of the stator 1 according to the third alternative. The third alternative differs from the stator 1 of FIG. 1 in that the receiver windings 13, 15, 17 have an almost sin curve shape each. This alternative is possible to reduce the high-frequency distortion in the received signal.

As described above, the receiver windings 13, 15, 17 are located at a certain distance from the folded portion 11 and the terminals T1, T2 of the transmission winding 9. Accordingly, these windings have circular arc shapes though they may have circumferential shapes as shown in FIGS. 17–20.

Figure 17:
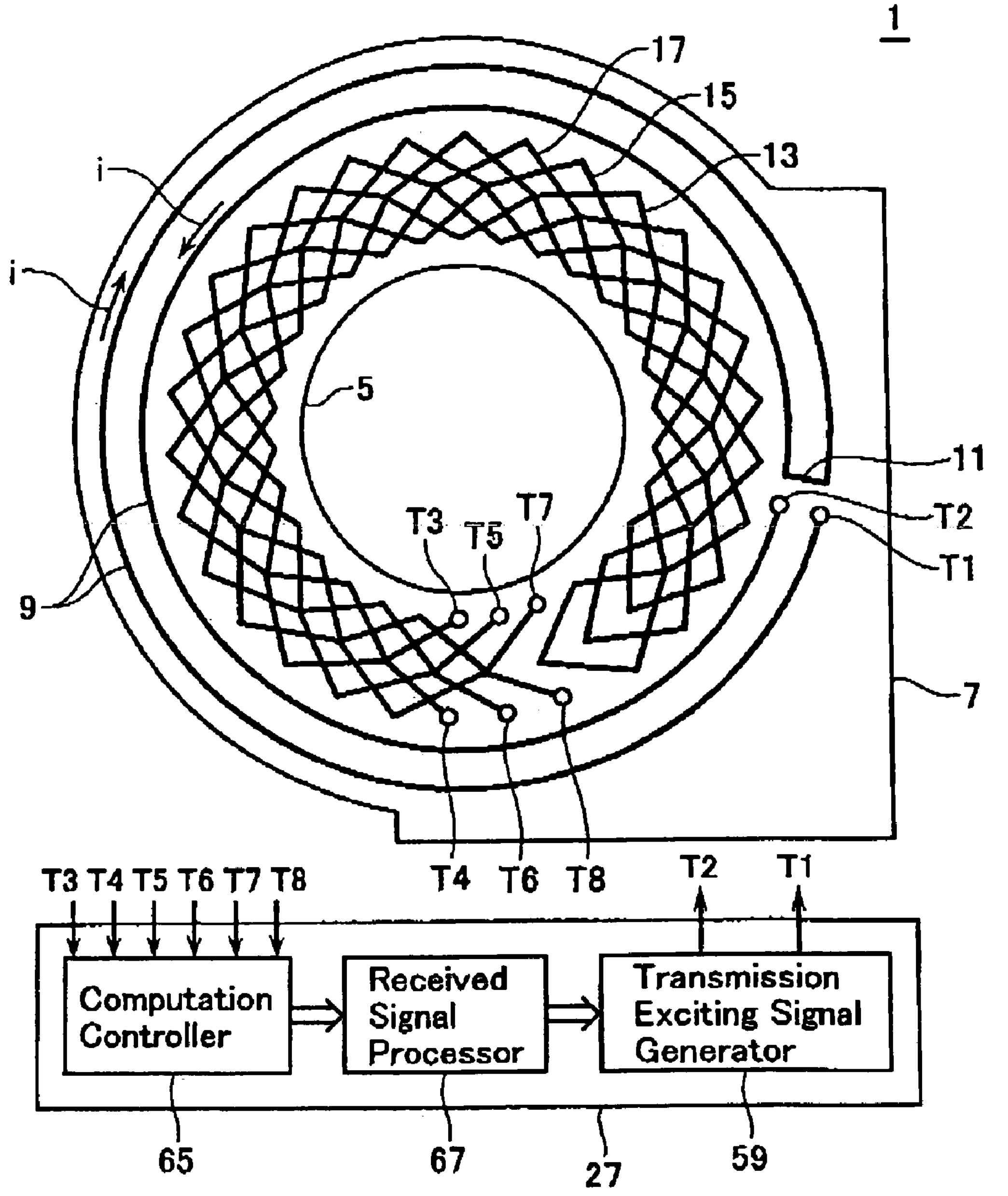
FIG. 17 is a plan view of a stator with the receiver winding shown in FIG. 1 that is formed in a circumferential shape.
Figure 18:
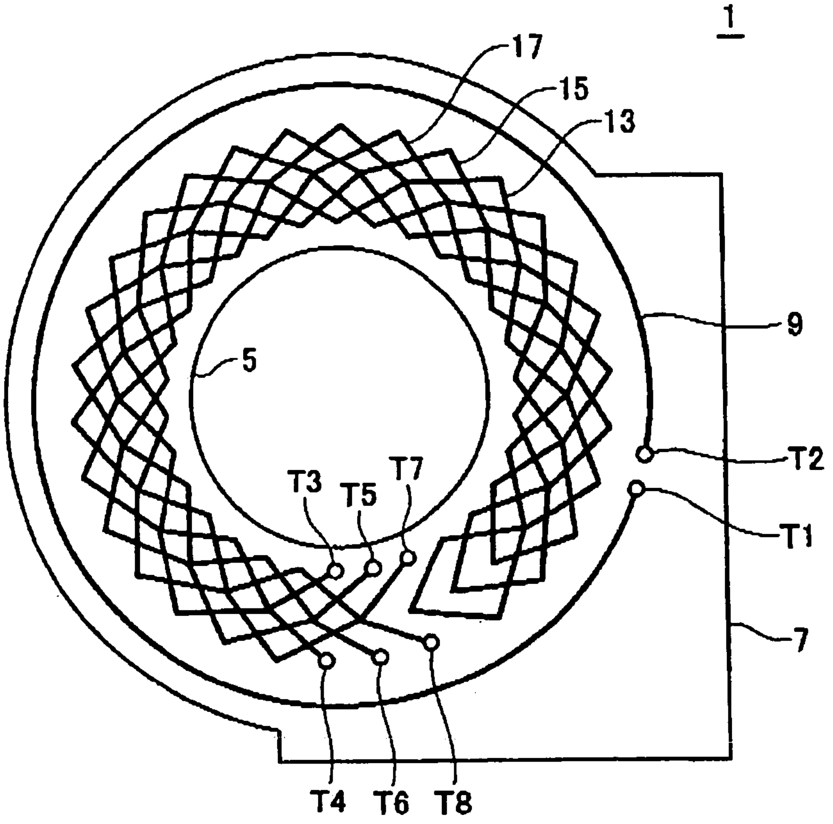
FIG. 18 is a plan view of a stator with the receiver winding shown in FIG. 14 that is formed in a circumferential shape.
Figure 19:
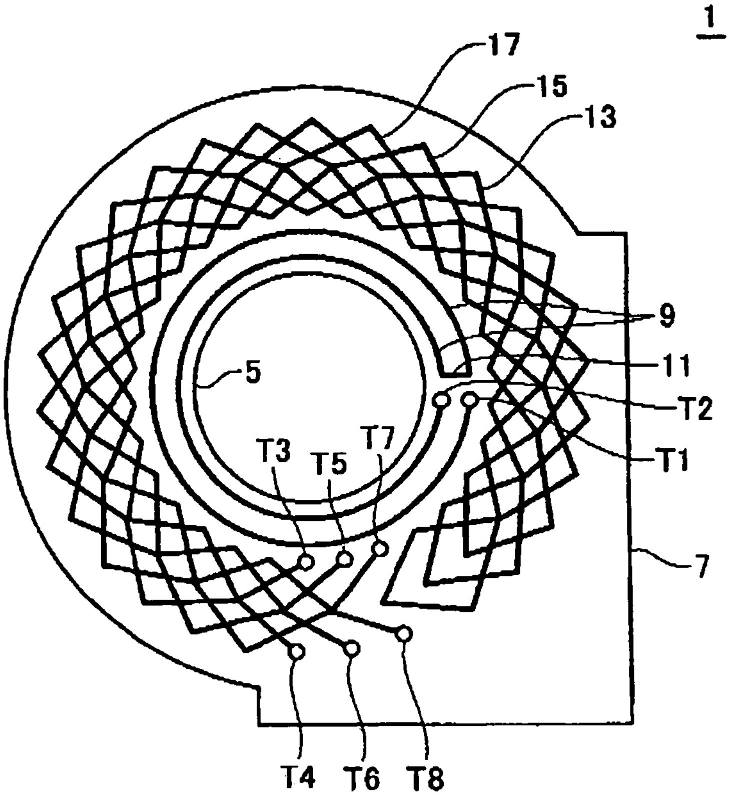
FIG. 19 is a plan view of a stator with the receiver winding shown in FIG. 15 that is formed in a circumferential shape.
Figure 20:
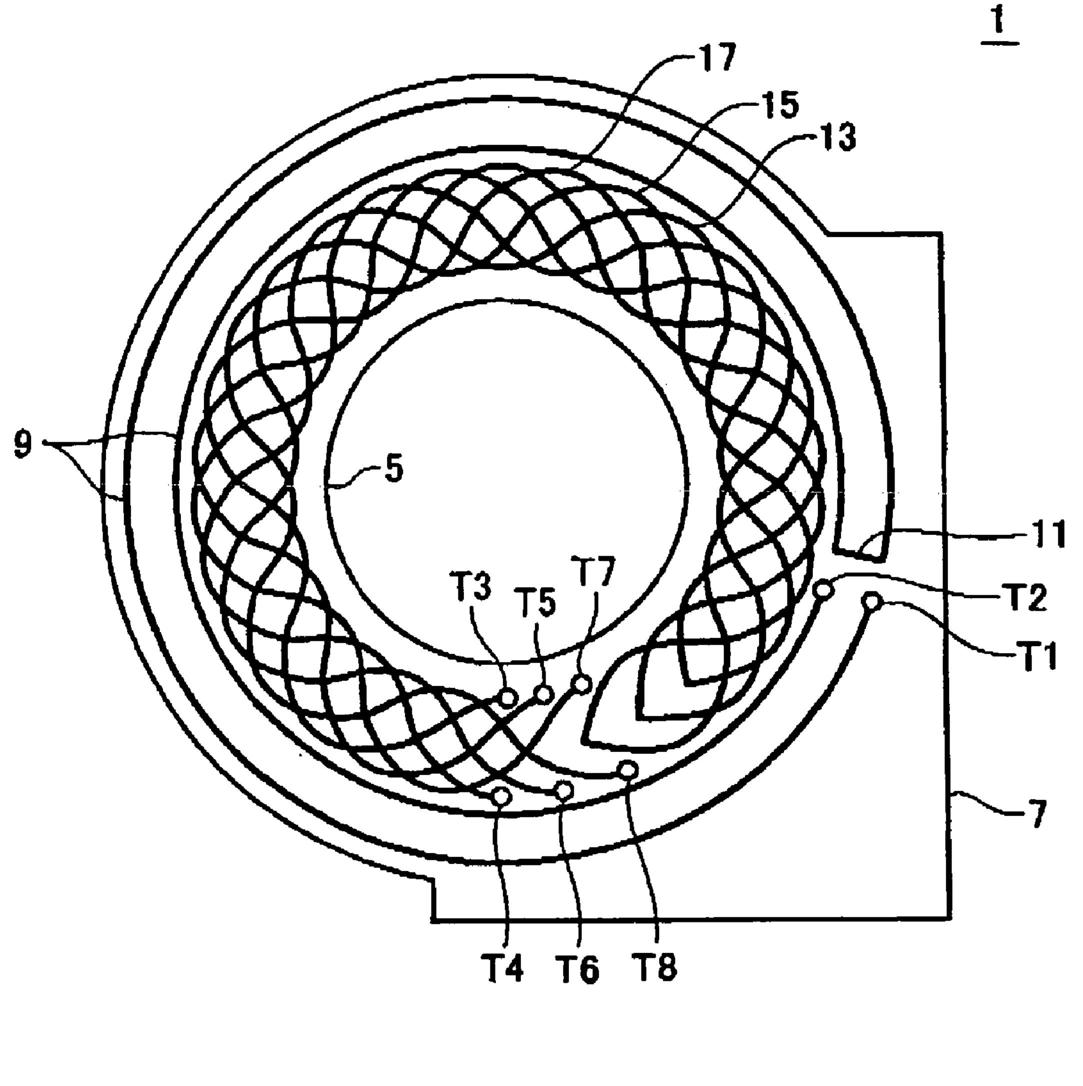
FIG. 20 is a plan view of a stator with the receiver winding shown in FIG. 16 that is formed in a circumferential shape.

FIG. 17 is a plan view of the stator with the receiver windings 13, 15, 17 shown in FIG. 1 that are formed in circumferential shapes. FIG. 18 is a plan view of the stator with the receiver windings 13, 15, 17 shown in FIG. 14 that are formed in circumferential shapes. FIG. 19 is a plan view of the stator with the receiver windings 13, 15, 17 shown in FIG. 15 that are formed In circumferential shapes. FIG. 20 is a plan view of the stator with the receiver windings 13, 15, 17 shown in FIG. 16 that are formed in circumferential shapes.

The receiver windings even having circumferential shapes ran achieve the above two effects of the first embodiment and, additionally, enlarge the dynamic range of the received signal wider than the receiver windings having circular arcs. The arrangement of the receiver windings around the entire circumference can greatly reduce the periodic error with a period of one rotation of the rotor.

Second Embodiment

Figure 21:
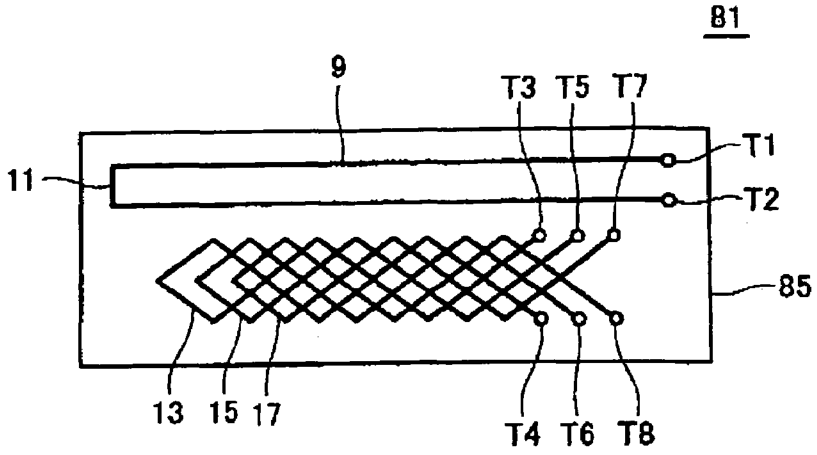
FIG. 21 is a plan view of a sensor head of an inductive displacement detector according to a second embodiment.
Figure 22:
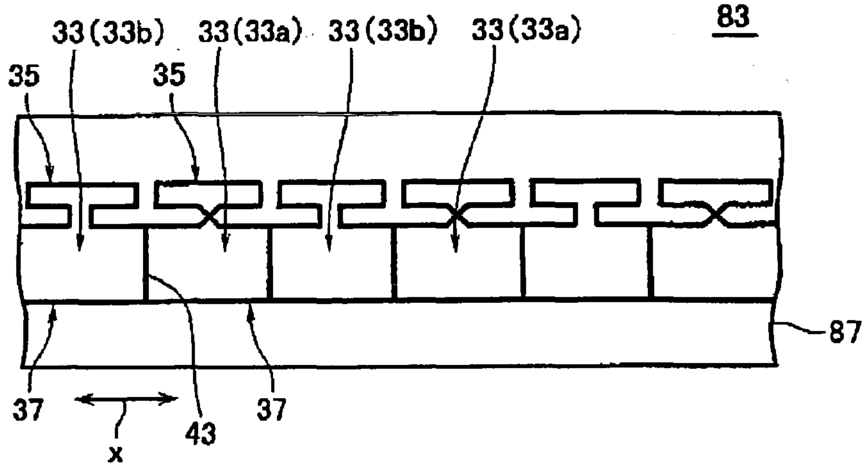
FIG. 22 is a plan view of a scale of the inductive displacement detector according to the second embodiment.

The inductive displacement detector according to the second embodiment is a linear encoder. A caliper is an example of the device that comprises the inductive displacement detector according to the second embodiment mounted thereon. The second embodiment is described mainly on the difference from the first embodiment. In the figures illustrating the second embodiment, the same parts as those denoted with the reference numerals described in the first embodiment are given the same reference numerals to omit its duplicated description. FIG. 21 is a plan view of a sensor head 81 of the inductive displacement detector according to the second embodiment, and FIG. 22 is a plan view of a scale 83 thereof.

The inductive displacement detector according to the second embodiment comprises the scale 83 (an example of the other winding holder) and the sensor head 81 (an example of the one winding holder) arranged opposite thereto. The scale 83 is shown by a part in the longitudinal direction. The sensor head 81 is arranged movable along the measurement axis x relative to the scale 83 with a certain gap spacing therebetween. The scale may be configured to move relative to the sensor head that is fixed instead. In a word, the sensor head and the scale may be arranged movable In a linear direction relative to each other.

The transmission winding 9 and the receiver windings 13, 15, 17 provided on the sensor head shown in FIG. 21 are obtained by re-forming the transmission winding 9 and the receiver windings 13, 15, 17 shown in FIG. 1 in linear shapes. In more detail, the sensor head 81 includes an Insulation substrate 85 composed of glass, silicon or resin. The transmission winding 9 shaped in a rectangle is disposed on a surface of the insulation substrate 85 opposite to the scale 83. The transmission winding 9 is configured to extend linearly (in a straight line) from one end to the folded portion 11 and fold back therefrom and extend linearly (in a straight line) to the other end. The receiver windings 13, 15, 17 are disposed adjacent to the transmission winding 9 on the surface of the insulation substrate 85 opposite to the scale 83.

The scale 83 includes an insulation substrate 87 composed of glass, silicon or resin. The flux coupling windings 33*a* and the flux coupling windings 33*b* are alternately arranged along the longitudinal direction of the scale 3 linearly on a surface of the substrate 87 opposite to the sensor head 81. The second embodiment described above has the same effects as those of the first embodiment.

Figure 23:
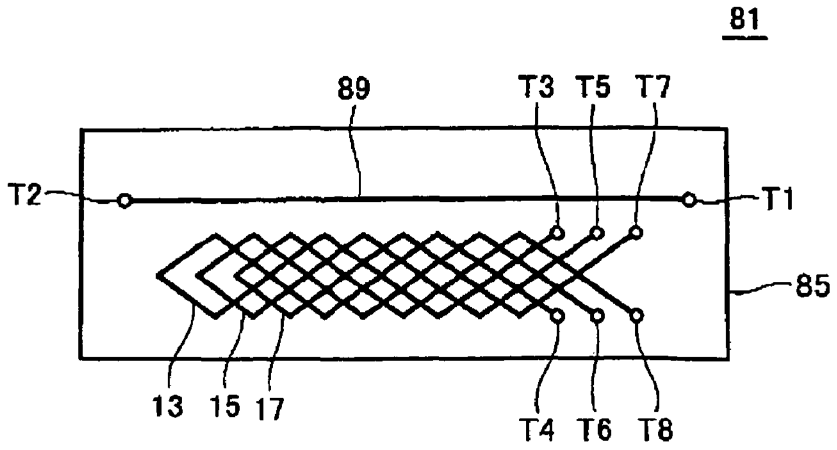
FIG. 23 is a plan view of a sensor head according to an alternative of the second embodiment.

An alternative of the second embodiment is described. FIG. 23 is a plan view of the sensor head 81 according to the alternative of the second embodiment. In this alternative, a transmission line 89 is disposed on the sensor head 81 and specifically configured to extend in a straight line from the terminal T1 to the terminal T2. The transmission line 89 functions similarly as the transmission winding. This alternative also has the same effects as those of the second embodiment. This alternative has sources of crosstalk at the terminals T1 and T2 (both ends) of the transmission line 89.

What is claimed is:

1. An inductive displacement detector, comprising:

a pair of winding holders arranged opposite, one to the other;

a transmission winding arranged on said one winding holder and configured to extend, from one end to a folded portion and fold back therefrom to the other end;

a receiver winding including a plurality of reception loops arranged along said transmission winding on said one winding holder; and a plurality of flux coupling windings capable of movement in a direction relative to said transmission winding and said receiver winding, each flux coupling winding including a closed line conductor, crossed or not crossed, having a receiver conductor capable of flux coupling to said transmission winding and a transmission conductor capable of flux coupling to said receiver winding, wherein said flux coupling winding with said line conductor crossed and said flux coupling winding with said line conductor not crossed are alternately arranged on said the other winding holder, and wherein adjacent transmission conductors share a side extending in a direction crossing said direction of relative movement.

2. The inductive displacement detector according to claim 1, wherein said flux coupling winding with said line conductor crossed locates said receiver conductor and said transmission conductor entirely in the same plane, with a three-dimensional intersection of said line conductor formed at a connection portion between said receiver conductor and said transmission conductor.

3. The inductive displacement detector according to claim 1, wherein said one winding holder comprises a stator, wherein said the other winding holder comprises a rotor, wherein said transmission winding is configured to extend from said one end to said folded portion describing a ring and fold back therefrom and extend to said the other end describing another ring, and wherein said flux coupling windings are alternately arranged in a ring.

4. The inductive displacement detector according to claim 3, wherein said two rings of said transmission winding are both located more inwardly than said receiver winding.

5. The inductive displacement detector according to claim 3, wherein said receiver winding has an almost sin curve shape.

6. The inductive displacement detector according to claim 3, wherein said receiver winding has a circular arc shape.

7. The inductive displacement detector according to claim 3, wherein said receiver winding has a circumferential shape.

8. A micrometer, comprising said inductive displacement detector according to claim 3 mounted thereon.

9. The inductive displacement detector according to claim 1, wherein said one winding holder comprises a sensor head, wherein said the other winding holder comprises a scale capable of movement in a linear direction relative to said sensor head, wherein said transmission winding is configured to extend from said one end linearly to said folded portion and fold back therefrom and extend again linearly to said the other end, and wherein said flux coupling windings are alternately arranged linearly.

10. An inductive displacement detector, comprising:

a stator and a rotor arranged opposite to each other;

a transmission winding arranged on said stator and configured to extend from one end to the other end describing a ring;

a receiver winding including a plurality of reception loops arranged along said transmission winding on said stator; and a plurality of flux coupling windings, each including a closed line conductor, crossed or not crossed, having a receiver conductor capable of flux coupling to said transmission winding and a transmission conductor capable of flux coupling to said receiver winding, wherein said flux coupling winding with said line conductor crossed and said flux coupling winding with said line conductor not crossed are alternately arranged in a ring on said rotor, and wherein adjacent transmission conductors share a side extending along a radius of said rotor.

11. The inductive displacement detector according to claim 10, wherein said flux coupling winding with said line conductor crossed locates said receiver conductor and said transmission conductor entirely in the same plane, with a three-dimensional intersection of said line conductor formed at a connection portion between said receiver conductor and said transmission conductor.

12. The inductive displacement detector according to claim 10, wherein said ring of said transmission winding is located more inwardly than said receiver winding.

13. The inductive displacement detector according to claim 10, wherein said receiver winding has an almost sin curve shape.

14. The inductive displacement detector according to claim 10, wherein said receiver winding has a circular arc shape.

15. The inductive displacement detector according to claim 10, wherein said receiver winding has a circumferential shape.

16. A micrometer, comprising said inductive displacement detector according to claim 10 mounted thereon.

17. An inductive displacement detector, comprising:

a sensor head;

a scale arranged opposite to said sensor head and capable of movement in a linear direction relative to said sensor head;

a transmission line arranged on said sensor head and configured to extend from one end to the other end in a straight line;

a receiver winding Including a plurality of reception loops arranged along said transmission line on said sensor head; and a plurality of flux coupling windings, each including a closed line conductor, crossed or not crossed, having a receiver conductor capable of flux coupling to said transmission line and a transmission conductor capable of flux coupling to said receiver winding, wherein said flux coupling winding with said line conductor crossed and said flux coupling winding with said line conductor not crossed are alternately arranged linearly on said scale, and wherein adjacent transmission conductors share a side extending in a direction crossing said direction of relative movement.

18. The inductive displacement detector according to claim 17, wherein said flux coupling winding with said line conductor crossed locates said receiver conductor and said transmission conductor entirely in the same plane, with a three-dimensional intersection of said line conductor formed at a connection portion between said receiver conductor and said transmission conductor.

19. The inductive displacement detector according to claim 17, wherein said receiver winding has an almost sin curve shape.

* * * * *